United States Patent [19]

Weber et al.

[11] 4,146,452

[45] Mar. 27, 1979

[54] ANHYDRIDE MODIFIED EPOXY ACRYLATE UV CURABLE COATING

[75] Inventors: Clyde A. Weber, Bentleyville; Jack S. Skinner, Pittsburgh, both of Pa.

[73] Assignee: Mobil Oil Corporation, New York, N.Y.

[21] Appl. No.: 835,113

[22] Filed: Sep. 21, 1977

Related U.S. Application Data

[63] Continuation of Ser. No. 654,496, Feb. 2, 1976, abandoned.

[51] Int. Cl.$^2$ .................. C08G 18/00; C08G 63/00
[52] U.S. Cl. .................. 204/159.14; 204/159.16; 204/159.18; 204/159.19; 204/159.23; 260/32.8 EP; 260/33.4 EP; 260/836; 260/837 R; 427/54; 428/418; 428/514
[58] Field of Search ............ 204/159.14, 159.16, 204/159.19, 159.23; 260/836, 837 R; 427/44, 54

[56] References Cited

U.S. PATENT DOCUMENTS

| | | | |
|---|---|---|---|
| 3,466,259 | 9/1969 | Jernigan | 260/37 |
| 3,713,864 | 1/1973 | Ackerman et al. | 117/38 |
| 3,759,807 | 9/1973 | Osborn et al. | 204/159.23 |
| 3,876,432 | 4/1975 | Carlick et al. | 96/115 P |
| 3,876,518 | 4/1975 | Borden et al. | 204/159.14 |

*Primary Examiner*—Richard B. Turer
*Attorney, Agent, or Firm*—Charles A. Huggett; Hastings S. Trigg

[57] ABSTRACT

A radiation curable coating composition for various substrates contains an adduct of acrylic acid and a diepoxy resin modified with an anhydride, such as maleic anhydride, and a low boiling alcohol and/or ketone vehicle. The coating composition can be pigmented and can also contain additives commonly used in coatings, such as wetting agents and flow control agents. The coating composition does not require the usual hydrocarbon vehicles that give rise to air pollution problems or reactive monomer vehicles that can create health hazards.

6 Claims, No Drawings

ANHYDRIDE MODIFIED EPOXY ACRYLATE UV CURABLE COATING

CROSS-REFERENCE TO RELATED APPLICATIONS

This application is a continuation of copending application Ser. No. 654,496, filed Feb. 2, 1976, now abandoned.

BACKGROUND OF THE INVENTION

1. Field of the Invention

This invention is directed to epoxy acrylate ester coatings for substrates, that are curable with UV radiation.

2. Description of the Prior Art

British Pat. No. 1,241,851 describes a process for coating an article that comprises applying a film of an ethylenically unsaturated ester having hydroxyl groups and exposing it to ionizing radiation. No liquid vehicle is used and the ester is not modified with an anhydride.

The coating composition of this invention comprises an anhydride modified similar resin in a vehicle that is predominantly non-reactive. This vehicle, when the coating composition is exposed to UV radiation and set, volatilizes but does not create a health or pollution hazard.

SUMMARY OF THE INVENTION

This invention provides a coating composition that comprises an adduct of acrylic acid and diepoxy resin modified with an anhydride and a low boiling alcohol or ketone vehicle and a photosensitizer and optionally, a tertiary amine cosensitizer.

It further provides substrates coated with the aforedefined coating composition.

DESCRIPTION OF SPECIFIC EMBODIMENTS

Prior practice has been to coat substrates, such as metals useful for container manufacture, with a variety of coating compositions comprising heat curable resinous components and volatile organic hydrocarbon solvents that are removed from the coating during the curing process. Recent restrictions on allowable atmospheric pollutants, the shortage of organic hydrocarbon solvents, and the shortage of fuels useful for firing curing ovens have created a need for coating compositions which can be cured with lower energy requirements and which eliminate the need for polluting organic solvents.

The coating compositions of this invention comprise an adduct, an alcohol and/or ketone vehicle, and a photosensitizer. The adduct is an adduct of acrylic acid and a diepoxy resin modified by reaction with an anhydride.

The epoxy resins are the diglycidyl ethers of bisphenols, a class of compounds which are constituted by a pair of phenolic groups interlinked through an intervening aliphatic bridge. While any of the bisphenols may be used, the compounds 2,2-bis (p-hydroxyphenyl) propane, commonly known as bisphenol A, is more widely available in commerce and is preferred.

The epoxy resins will have an epoxy equivalent weight of between about 170 and about 2,000 and an epoxy value between about 0.60 and about 0.05. The preferred epoxy resins, i.e., those made from bisphenol A, will have two epoxy groups per molecule. Accordingly, the stoichiometric amount of acrylic acid to form a diacrylate adduct would be two moles of acid for each two epoxy groups. In practice, however, it is preferred to use slightly less acid than the amount necessary to cover both epoxy groups to be certain that there is no free acrylic acid remaining in the reaction product. Free acid would contribute to excessive volatility of deposited films, while minor amounts of free epoxy are not objectionable. Therefore, the amount of acrylic acid reacted can be between about 1.85 moles to about 2.0 moles of acid per two epoxy groups. The esterification reaction between the acrylic acid and epoxy resin is carried out at an esterification temperature, e.g. between about 90° C. and about 110° C. Esterification is continued until an acid number of 5–15 is obtained. This reaction ordinarily takes place in 8–15 hours.

The epoxy diacrylate is then further reacted with an anhydride. Maleic anhydride is preferred but other anhydrides are contemplated for this purpose, such as citraconic anhydride, succinic anhydride, ethylsuccinic anhydride, amylenesuccinic anhydride, itaconic anhydride, glutaric anhydride, $\Delta$4-tetrahydrophthalic anhydride, phthalic anhydride, hemimellitic anhydride, and trimellitic anhydride. The amount of anhydride used will be between about 0.1 and about 1.0 mole anhydride per mole diacrylate resin. This reaction is generally carried out at temperatures between about 80° C. and about 90° C. The reaction is considered complete when the alcoholic KOH and aqueous KOH acid numbers substantially agree and they are in the range of about 10–40. This evidences a complete absence of anhydride functionality.

The esterification reaction and the further reaction with anhydride can occur without the aid of a catalyst. However, catalysts are preferred such as tertiary amines; quaternary ammonium hydroxides, such as benzyltrimethylammonium hydroxide; N,N-dimethylaniline; N,N-benzylmethylamine; triethylamine; and KOH. It is also advantageous to use small amounts of hydroquinone as a polymerization inhibitor.

The anhydride modified epoxy diacrylate, prepared as aforedescribed, is then dissolved in an alcohol and/or ketone (low boiling) vehicle to prepare the coating composition. The low boiling vehicle contemplated herein is an alcohol or a ketone boiling up to about 125° C. or mixtures of such alcohols and ketones. Suitable alcohols include methanol, ethanol, propanol, isopropanol, butanol, 2-Butanol, and 2-methyl-2-propanol (t-butyl alcohol). Suitable ketones include acetone, methyl ethyl ketone, diethyl ketone, ethylpropyl ketone, methyl propyl ketone, and diisopropyl ketone. The amount of alcohol, ketone, or mixtures thereof used should be sufficient to produce a coating composition having a viscosity of 100–150 cps. and a solids content of 50–80%.

In some applications, such as in paper varnishes, a portion (up to about 20 weight percent) of the low-boiling vehicle can be non-volatile, reactive oligomer, such as a polyacrylate of a polyhydric alcohol. Suitable materials include trimethylolpropane triacrylate, neopentylglycol diacrylate, pentaerythritol triacrylate, a pentaerythritol tetraacrylate.

The coating composition is cured by exposure to UV radiation. A photosensitizer is needed. Suitable sensitizers include acetophenone, 4'-t-butyl-2,2,2-trichloroacetophenone, 4'-phenoxy-2,2-dichloroacetophenone, diethoxyacetophenone, benzophenone, xanthone, benzoin isobutyl ether, benzoin isopropyl ether, and 2-chlorothioxanthone. 2-Chlorothioxanthone is preferred when the formulation is pigmented. A tertiary amine co-sensitizer may also be used in the UV curable coating formulation. It is not essential, but it serves to speed up the cure rate. In order to realize this function, it is necessary to have free amine present. Accordingly, the amine concentration range when a co-sensitizer is used, is from about 1.25 to about 3 times the amount required to neutralize free acidity. The amount required for neutralization can be readily calculated from the determined acid number of the resin. The tertiary amines are normally liquid trialkylamines, trialkanolamines, or tertiary mixed alkylalkanolamines. Non-limiting examples of such, amines are triethylamine, triisopropylamine, tributylamine, trihexylamine, tri-2-ethylhexylamine, tridodecylamine, methyldiethanolamine, dimethylethanolamine, 2-hydroxyethyldiisopropylamine, and triethanolamine.

The coating compositions described so far produce clear coatings and are useful as such.

Although a pigment is not necessary, a pigment can be incorporated into the coating composition of this invention. The preferred pigment is titanium dioxide for white base coats, but any well known filler pigment can be used, such as zinc oxide, bentonite, silica, ochers, and chrome yellows or greens.

Depending upon whether the coating composition is pigmented or not, the broad and preferred ranges of concentration of the components are as set forth in the following Table I.

TABLE I

| Component | Broad, Wt. % | | Preferred, Wt. % | |
|---|---|---|---|---|
| | Pigmented | Not Pigmented | Pigmented | Not Pigmented |
| Adduct Resin | 10–30 | 40–90 | 15–30 | 50–80 |
| Vehicle | 40–60 | 10–60 | 30–50 | 20–50 |
| Tertiary Amine | 0.6–6 | 0–6 | 2–4 | 0–4 |
| Sensitizer | 0.1–6 | 0.1–6 | 0.5–1 | 0.5–5 |

The coating composition is applied to a usual substrate metal, paper, plastic films, leather, cloth, etc., using any of the usual methods of application, including wiping, spraying, gravure, offset gravure, and rollcoat application. Suitable metallic substrates include aluminum, sheet or foil, steel, and tin-plated steel. The rate of application will be sufficient to apply the coating at about 0.5–10 mg./sq. in. After application, the coating is set by exposure to UV radiation for between about 0.01 second and about 30 seconds. In some cases, the coating will be set by short exposure to radiation, e.g. less than one second, which is sufficient to set the film so that it will accept inks and/or wet-ink varnish. Following the printing or varnishing operation, these coats may be further set by baking at about 250° F. to 450° F. for between about 3 seconds and about 5 minutes.

Any suitable source of ultraviolet light radiation can be used. Preferably, an ultraviolet light of a wave length below 4000 Angstrom Units is used. Cure speeds can be 25–200 ft./min. per lamp.

The following examples demonstrate the preparation of adducts and coatings containing them, in accordance with this invention.

EXAMPLE 1

Using a vessel equipped with an agitator, a reflux condenser and a charging port, there were charged 7200 g. Epon 828, 2590 g. glacial acrylic acid, 15 g. triethyl amine and 1.2 g. hydroquinone. Epon 828 is a diglycidyl ether of bisphenol A having an epoxy equivalent weight of about 185–192 and an epoxide value of 0.52–0.54. Agitation was started and the mixture was heated to 100° C. Temperature was maintained at 95°–100° C. until an acid number of 5–10 was obtained; at this point, was added 432 g. maleic anhydride and the temperature was held at 90° C. until the acid number, as determined by alcoholic KOH and aqueous KOH, agreed, thereby indicating the complete absence of anhydride functionality. The normal time for this phase of the resin preparation was 1.5 hours. The molar ratio of maleic anhydride to epoxy resin was 0.25.

EXAMPLE 2

Using a reaction vessel equipped with an agitator, a reflux condenser, and a charging port, there were charged 525 g. Epon 1004 and 70 g. toluene. Epon 1004 is a diglycidyl ether of bisphenol A having an epoxy equivalent weight of 875–1025 and an epoxide value of 0.097–0.11. Heat and agitation were started. Temperature was raised to reflux to remove water (a pot temperature of 150°–160° C.). The mixture was cooled to 80°–85° C. and there were added 40 g. glacial acrylic acid, 1 g. triethyl amine and 0.1 g. hydroquinone. Temperature was raised to 95°–100° C. for esterification and the reaction continued until an acid number of 8–13 was obtained. This was cooled to 80°–85° C. and there was added 7 g. maleic anhydride. Temperature was held at 80°–85° C. for 1½ to 2 hours until alcoholic KOH and aqueous KOH acid numbers agreed (10–15). The mixture was heated at 80°–85° C. and vacuum applied for toluene removal.

The following examples demonstrate the coating compositions of this invention and their performance in coating metals and paper stock. Coatings were evaluated using the following tests:

Pasteurized Resistance (Past. Adh.)

Pasteurization is carried out by immersing the coated panel in water at 170° F. for 45 minutes. Then, the panel is wiped dry with an absorbent towel and a coated area of the panel is cross-hatched with individual score lines approximately 1/16 inch apart. Scotch tape is firmly applied to the cross-hatched area and removed with a quick snap. Adhesion is rated on a scale of 0 to 10 with 10 representing perfect, i.e., no coating was pulled off with the tape. Blush, i.e., clouding of the film is rated on a 0 to 10 scale with 10 representing no blush.

Adhesion (Dry)

The adhesion test is carried out as described under Pasteurization Resistance, i.e., cross-hatching the coated area, applying Scotch brand tape, removing it, and observing the amount of coating.

Antiblocking

A 4 × 4 inches coated panel is placed coated side up and a double sheet of facial tissue is placed over the coating. Then, another 4 × 4 inches panel is placed over the facial tissue coated side down, thus forming a "sandwich". This sandwich is placed on a preheated flat metal plate in an oven maintained at 120° ± 5° F. and a preheated, flat bottom 100 lbs. weight is placed on top of the sandwich. This assembly is kept undisturbed in the oven for 24 hrs. and the sandwich is removed from the oven. The panels are separated and the facial tissue is removed. Rating is on a scale of 0–10 with 10 representing perfect, i.e., no adherence of facial tissue or "fuzzy".

Fabrication

This test measures the ability of a coating to withstand the distortion and flexing encountered in forming continuous thread screw caps. Four screw cap blanks are formed. Two are coated on the inside and two on the outside. The blanks are formed into shells and threaded on standard 28 mm. fabricating and threading machines and treated with copper sulfate. Rating is made by observing the deposition of copper at (A) the shoulder, (B) the thread, inside and outside. The shoulder rating is an average value of rating both caps having an outside coating. The thread rating is an average value by rating all four caps. In all cases 50% of the rating is contributed by the average outside rating and 50% by the average inside rating. The curl rating is an average value by rating the caps having an inside coating. Each area is rated on a scale of 0-10 with 10 representing perfect, i.e., no copper deposit. The final reported rating is the sum of the three average ratings at the three areas, i.e., 30 would be a perfect overall rating.

EXAMPLE 3

A coating composition was prepared containing 43.7 parts (all parts by weight) resin of Example 2, 2.3 parts 4'-t-butyl-2,2,2-trichloroacetophenone, 0.5 part silicone (BYK-300), and, as solvent vehicle, 18.0 parts methyl ethyl ketone and 35.5 parts isopropanol. This coating composition was applied to 10 mil aluminum at the rate of 100 ft./min. and at a coating weight of 2-3 mg./sq. in. The film was cured by UV at a rate of 16-33 ft./min.200W/inch lamp. Some test samples were also post-baked for 10 min. at 350° F. Test results are set forth in Table II.

TABLE II

| UV cured only [1] | |
|---|---|
| Antiblocking | 8 |
| Adhesion (Dry) | 2-5 |
| Fabrication (30 = Perfect) | 10-12 |
| Post-baked [1] | |
| Antiblocking | 10 |
| Adhesion (Dry) | 10 |
| Fabrication (30 = Perfect) | 28 |
| Blush Resistance (Pasteurized) | 10 |
| Adhesion (Pasteurized) | 10 |

[1] Rating Scale: 10 = Perfect except as noted.

EXAMPLE 4

A paper varnish was prepared using 64.8 parts resin of Example 1, 5.4 parts trimethylol propane triacrylate, 3.2 parts 4'-t-butyl-2,2,2-trichloroacetophenone, 1.1 parts silicone (BYK-300), and 25.5 parts isopropanol. This varnish was applied to 34 lb. clay coated (one side) Kraft paper and cured by UV as described in Example 3. Test data for the resultant coating are set forth in Table III.

TABLE III

| Gloss (60°) | 85 |
|---|---|
| Dry Adhesion (tape-no cross hatch) | 10 |
| Heat seal resistance* | No seal or pick |

*Coating to coating heated at 400° F. for 3 sec. under 40 psi.

Other well known adjuvants may be added to the coating composition such as flow control agents and waxes. Waxes, if used, are added as slurries or emulsions of petroleum (paraffin) wax, natural waxes such as montan wax, beeswax, and carnauba wax, or synthetic waxes such as polyethylene wax.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A UV light curable coating composition that consists essentially of, by weight of said composition, 10-90% of a diacrylate of a diglycidyl ether of a bisphenol further reacted with 0.1-1 mole of a dicarboxylic acid anhydride per mole of said diacrylate, 10-60% of a low boiling vehicle comprising an alcohol, a ketone, or mixtures thereof 0.1-6% of photosensitizer, and 0-6% of a tertiary amine cosensitizer.

2. The coating composition of claim 1, wherein said bisphenol is bisphenol A and said dicarboxylic acid anhydride is maleic anhydride.

3. The coating composition of claim 2, wherein said photosensitizer is 4'-t-butyl-2,2,2-trichloroacetophenone.

4. The coating composition of claim 3, wherein said vehicle is a mixture of methyl ethyl ketone and isopropanol.

5. A substrate coated with the coating composition of claim 1.

6. A metal substrate coated with the coating composition of claim 4.

* * * * *